US011729043B2

(12) United States Patent
Oliveira et al.

(10) Patent No.: US 11,729,043 B2
(45) Date of Patent: Aug. 15, 2023

(54) TRAFFIC OUTAGE DETECTION IN THE INTERNET

(71) Applicant: Cisco Technology, Inc., San Jose, CA (US)

(72) Inventors: Ricardo V. Oliveira, San Francisco, CA (US); Matias Fontanini, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/013,717

(22) Filed: Jun. 20, 2018

(65) Prior Publication Data

US 2019/0109757 A1   Apr. 11, 2019

Related U.S. Application Data

(60) Provisional application No. 62/569,266, filed on Oct. 6, 2017.

(51) Int. Cl.
*H04L 41/046* (2022.01)
*H04L 41/12* (2022.01)
*H04L 43/045* (2022.01)
*H04L 43/50* (2022.01)

(52) U.S. Cl.
CPC .......... *H04L 41/046* (2013.01); *H04L 41/12* (2013.01); *H04L 43/045* (2013.01); *H04L 43/50* (2013.01)

(58) Field of Classification Search
CPC ..... H04L 41/046; H04L 41/12; H04L 43/045; H04L 43/50
See application file for complete search history.

(56) References Cited

U.S. PATENT DOCUMENTS

| 8,458,301 | B1 * | 6/2013 | Andrus | H04L 41/0816 |
| | | | | 709/220 |
| 9,411,787 | B1 * | 8/2016 | Lad | H04L 41/046 |
| 9,455,890 | B2 * | 9/2016 | Lad | H04L 41/042 |
| 9,503,384 | B1 * | 11/2016 | Oliveira | H04L 43/0841 |
| 2003/0236844 | A1 | 12/2003 | Kaler | |
| 2004/0221296 | A1 | 11/2004 | Ogielski | |
| 2005/0036487 | A1 | 2/2005 | Srikrishna | |
| 2007/0140133 | A1 | 6/2007 | Gudipalley | |

(Continued)

FOREIGN PATENT DOCUMENTS

CN         100388695         5/2008

OTHER PUBLICATIONS

Oliveira et al., Quantifying the Completeness of the Observed Internet AS-Level Structure, 2008.

(Continued)

*Primary Examiner* — John A Follansbee
*Assistant Examiner* — Fadi Haj Said
(74) *Attorney, Agent, or Firm* — Behmke Innovation Group LLC; James M. Behmke; Jonathon P. Western

(57) ABSTRACT

Techniques for performing traffic outage detection in the Internet are disclosed. In some embodiments, a system, process, and/or computer program product for traffic outage detection in the Internet includes deploying a plurality of agents and a plurality of tests to be executed by the deployed agents; collecting path trace data from the plurality of agents to identify one or more terminal events; and detecting a network outage based on the one or more terminal events.

19 Claims, 12 Drawing Sheets

(56) References Cited

U.S. PATENT DOCUMENTS

| | | |
|---|---|---|
| 2008/0155093 A1 | 6/2008 | Dharmistan |
| 2008/0301135 A1 | 12/2008 | Alves |
| 2010/0080129 A1 | 4/2010 | Strahan |
| 2011/0282988 A1* | 11/2011 | Wang ............... H04L 41/12 709/224 |
| 2012/0008509 A1* | 1/2012 | Myers ............... H04W 24/06 370/252 |
| 2013/0311832 A1* | 11/2013 | Lad ............... H04L 41/0631 714/37 |
| 2016/0109495 A1* | 4/2016 | Sterkel ............... H04L 67/303 702/62 |
| 2016/0134502 A1* | 5/2016 | Edwards ............... H04L 12/66 370/252 |
| 2016/0299947 A1* | 10/2016 | Pangeni ............... G06F 16/24537 |
| 2016/0359900 A1* | 12/2016 | Crisler ............... H04L 63/1425 |
| 2017/0099626 A1* | 4/2017 | Privette ............... H04W 48/08 |
| 2017/0245176 A1* | 8/2017 | Murphy ............... H04L 41/145 |
| 2018/0204135 A1* | 7/2018 | Narasimha ............... G06N 20/00 |
| 2018/0276063 A1* | 9/2018 | Mendes ............... G06F 11/3409 |
| 2018/0279139 A1* | 9/2018 | Serrano Garcia ..... H04W 36/08 |
| 2019/0068624 A1* | 2/2019 | Compton ............... H04L 63/1441 |

OTHER PUBLICATIONS

Vazquez et al., Internet Topology at the Router and Autonomous System Level, Jun. 6, 2002.

Villamizar et al., Network Working Group, BGP Route Flap Damping, Nov. 1998.

Zhang et al., PlanetSeer: Internet Path Failure Monitoring and Characterization in Wide-Area Services, Department of Computer Science, Princeton University, Proceedings of the 6th Symposium on Operating Systems Design and Implementation, Dec. 6-8, 2004.

European Search Report dated Apr. 22, 2021 in connection with European Patent Application No. 18864596.

International Search Report dated Jul. 15, 2021 in connection with International Patent Application No. PCT/US2021/027583.

* cited by examiner

TRAFFIC OUTAGE DETECTION IN THE INTERNET

CROSS REFERENCE TO OTHER APPLICATIONS

This application claims priority to U.S. Provisional Patent Application No. 62/569,266 entitled TRAFFIC OUTAGE DETECTION IN THE INTERNET filed Oct. 6, 2017, which is incorporated herein by reference for all purposes.

BACKGROUND OF THE INVENTION

Web services can be used to provide communications between electronic/computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Cloud computing generally refers to the use of computing resources (e.g., hardware and software) that are delivered as a service over a network (e.g., typically, the Internet). Cloud computing includes using remote services to provide a user's data, software, and computation.

Distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

BRIEF DESCRIPTION OF THE DRAWINGS

Various embodiments of the invention are disclosed in the following detailed description and the accompanying drawings.

DETAILED DESCRIPTION

Figure 1:
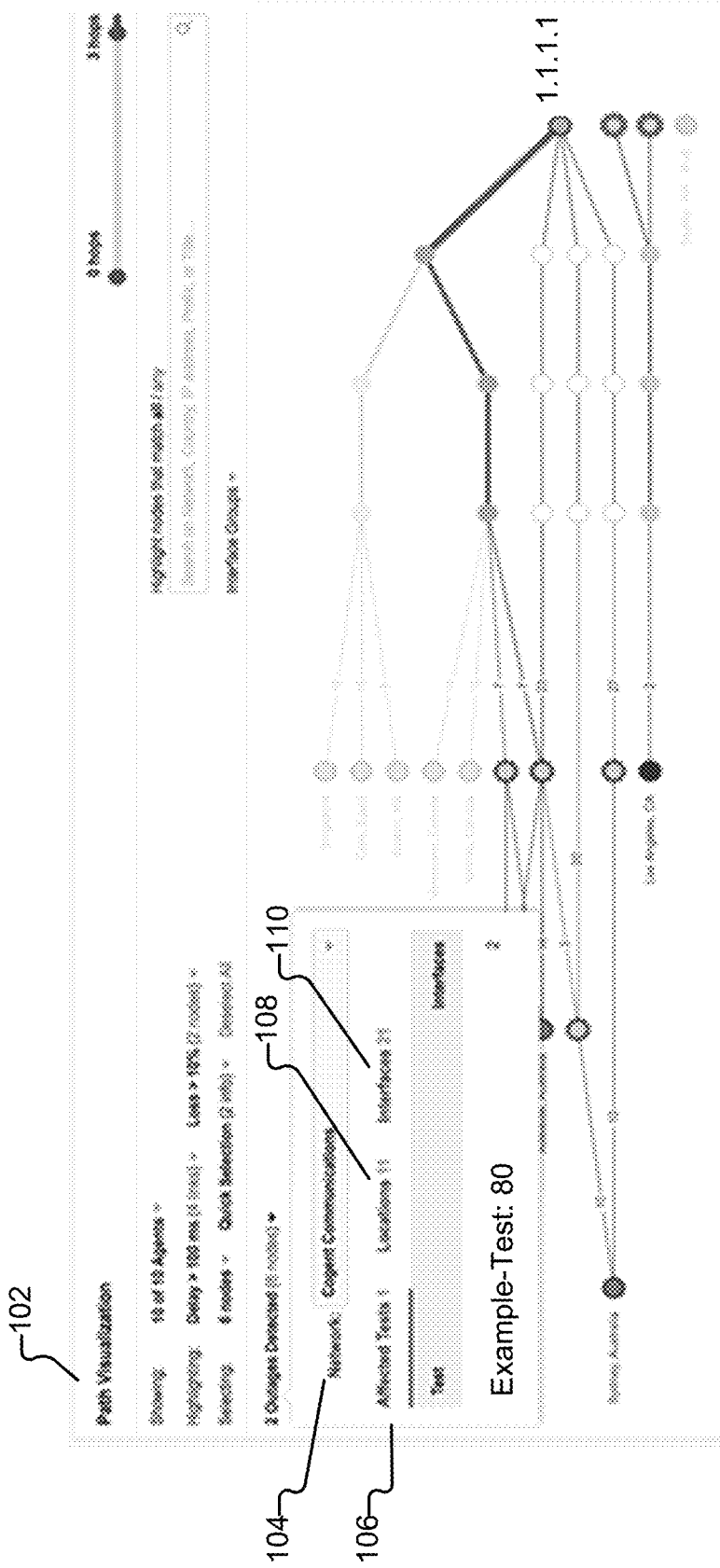
FIG. 1 is a path visualization with overlaying outage context in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems.

What are needed are new and improved techniques to monitor, visualize and troubleshoot the performance of cloud-based/web-based services (e.g., distributed applications and SaaS-based solutions available as web services via web sites and/or using other cloud-based implementations of distributed applications) to, for example, facilitate detection of various networking related performance problems and determining the locations and/or root causes of such networking related performance problems.

Overview of Techniques for Traffic Outage Detection in the Internet

Various techniques are disclosed for performing traffic outage detection in the Internet. For example, the disclosed techniques for traffic outage detection in the Internet facilitate detecting Internet-wide outages across different service providers (e.g., Internet Service Providers (ISPs)) based on path trace data collected from agents (e.g., cloud and/or enterprise-deployed agents). Data plane data can be collected and/or received from agents that periodically perform path traces to application endpoints, such as application endpoints for cloud-based/web-based services (e.g., distributed applications and SaaS-based solutions available as web services via web sites and/or using other cloud-based implementations of distributed applications). Contextual information about outages can be used to determine performance degradation of applications, and contextual information about outages can also be used to pinpoint root causes of events to specific providers and geographic locations.

In some embodiments, a system, process, and/or computer program product for traffic outage detection in the Internet includes collecting network traffic data from agents performing active network tests (e.g., for a plurality of ISPs across the Internet); filtering the collected network traffic data; and determining a network traffic outage event on the Internet. For example, the active network tests can include path trace tests as further described below. In an example implementation, the filtering of the collected network traffic data (e.g., based on path trace tests) can include performing or utilizing one or more of the following (e.g., which are also further described below): excluding interfaces in source and stub networks, an Autonomous System Number (ASN) blacklist, a blacklist filter, a whitelist filter, a noise filter, a geography-based (geo-based) filter, and HyperText Transfer Protocol (HTTP) ports 80 and 443.

In various embodiments, the system, process, and/or computer program product for traffic outage detection in the Internet can further include enriching the outage detection events with metadata and generating a user interface (e.g., a Graphical User Interface (GUI)) for a visualization of the enriched outage detection events, alerting, and/or other reporting associated with the outage detection events. For example, a graphical visualization can include a path visualization with overlaying outage context, an outage map (e.g., over time/hot spots), and/or an outage topology visualization as further described below. As another example, various types of alerts can be automatically generated based on outage detection events as also further described below.

In some embodiments, a system, process, and/or computer program product for traffic outage detection in the Internet includes deploying a plurality of agents and a plurality of tests to be executed by the deployed agents; collecting path trace data from the plurality of agents to identify one or more terminal events; and detecting a network outage based on the one or more terminal events. For example, network traffic test results can be collected for a plurality of Internet Service Providers (ISPs) to detect network outages in the Internet using the below described techniques.

In some embodiments, a system, process, and/or computer program product for traffic outage detection in the Internet further includes collecting test results from each of the plurality of agents for the plurality of tests.

In some embodiments, a system, process, and/or computer program product for traffic outage detection in the Internet further includes filtering the path trace data collected from each of the plurality of agents for the plurality of tests. For example, the path trace data can be filtered using various filtering operations as further described below.

In some embodiments, a system, process, and/or computer program product for traffic outage detection in the Internet further includes merging outage events. For example, various detected outages can be merged based on aggregations of terminal events on an ASN basis using the platform as further described below.

In some embodiments, a system, process, and/or computer program product for traffic outage detection in the Internet further includes generating a graphical visualization of the outage detection (e.g., an outage map and/or other visualizations that can show outages over time and/or hot spots) and outputting the graphical visualization of the outage detection.

In some embodiments, a system, process, and/or computer program product for traffic outage detection in the Internet further includes generating a report of the outage detection and outputting the report of the outage detection.

In some embodiments, a system, process, and/or computer program product for traffic outage detection in the Internet further includes generating an alert for the outage detection.

In some embodiments, a system, process, and/or computer program product for traffic outage detection in the Internet further includes excluding interfaces in source and stub networks, such as further described below.

In some embodiments, a system, process, and/or computer program product for traffic outage detection in the Internet further includes excluding noisy interfaces. For example, various techniques are disclosed for filtering noisy interfaces.

In some embodiments, a system, process, and/or computer program product for traffic outage detection in the Internet further includes excluding noisy targets. For example, various techniques are disclosed for filtering noisy targets.

In some embodiments, a system, process, and/or computer program product for traffic outage detection in the Internet further includes applying an ASN blacklist, such as further described below.

In some embodiments, a system, process, and/or computer program product for traffic outage detection in the Internet further includes applying a geo-based filter (e.g., geo filter), such as further described below.

In some embodiments, a system, process, and/or computer program product for traffic outage detection in the Internet further includes applying a port-based filter (e.g., for HTTP ports 80 and/or 443), such as further described below.

As further described below, these and various other features and techniques are disclosed for performing traffic outage detection in the Internet.

Path Traces and Terminal Paths

In one embodiment, path traces are collected and/or received from agents that have tests configured. Agents can either be managed by a network monitoring service provider (e.g., cloud agents managed by a network monitoring service provider, such as ThousandEyes, Inc.), or installed and managed by enterprise customers (e.g., enterprise agents installed inside the customer on their enterprise network). A path trace represents the sequence of routers traversed by packets from a source all the way to a target application or another agent, such as described in U.S. Pat. No. 9,455,890 entitled DEEP PATH ANALYSIS OF APPLICATION DELIVERY OVER A NETWORK granted Sep. 27, 2016, which is incorporated herein by reference for all purposes. The path trace is generated based on tests that can be configured by a network monitoring service provider and/or enterprise customers. For example, if a customer, ACME COMPANY, decides to monitor an application (e.g., any type of distributed applications and SaaS-based solutions available as web services via web sites and/or using other cloud-based implementations of distributed applications), EXAMPLE-APP, then an enterprise agent inside ACME COMPANY's network can be configured to periodically discover the L3 path from the source to the destination (e.g., application endpoint for EXAMPLE-APP).

A terminal path is a path that ends in a specific interface that is not the destination or final server. The last node in a terminal path (e.g., also referred to as a terminal node as further described below) is the last known interface that is known to have forwarded packets to a specific application. This typically means that an upstream interface (e.g., usually adjacent) is the one responsible for the packet loss. As further described below, terminal paths can be identified and utilized to detect outages in the Internet.

Outage Detection

In one embodiment, the collected and/or received path traces from all the agents are periodically processed using the disclosed system, and the path traces that have terminal paths are filtered as further described below. The last hop in a terminal path is what is referred to herein as a terminal node. A terminal node is the last interface known to have forwarded the packet.

For example, the disclosed system can generate a time-series of terminal nodes by slicing time in 300 second bins (e.g., five minute windows of time or another time window can be used), and, in each bin, the system can keep track of terminal nodes, as well as tests, agents, and applications impacted by the terminal node.

In this example, terminal interface events are represented by a tuple (ASN, location id, interface ip). ASN is the BGP autonomous system that the IP address maps to using longest prefix matching. Location ID (e.g., location id in the tuple) is a geographic area that typically maps to a city or metropolitan area. Interface IP (e.g., interface ip in the tuple) is the IP address of the network interface.

Filtering Operations

There are several mechanisms that the system can use to filter the noise on interfaces, especially at the edge of the network where terminal events can be relatively frequent due to firewalls, NATs, load balancers, and/or other miscellaneous middle boxes as will now be described.

As a first example filter, interfaces in source and stub networks can be excluded. Specifically, interfaces in the same ASN as the agent can be excluded and interface ASNs that are Stubs can also be excluded. For example, the algorithm described in Oliveira et al., Quantifying the Completeness of the Observed Internet AS-level Structure, UCLA Computer Science Department—Technical Report TR-080026-2008, http://irl.cs.ucla.edu/~rveloso/papers/completeness_tr.pdf, can be used to classify ASNs in stubs or service providers. A whitelist of ASNs belonging to major Content Delivery Networks (CDNs) and Domain Name System (DNS) providers can be used so that outages involving those ASNs are not filtered even though they may be stubs. Also, cases where an interface has a private IP range can be excluded.

As a second example filter, noisy interfaces can be excluded. Specifically, some interfaces throttle Internet Control Message Protocol (ICMP) time exceeded, so a penalty system can also be performed to exclude these interfaces similar to the Border Gateway Protocol (BGP) Route Flap Dampening (RFD) algorithm with exponential decay of penalties, as further discussed below.

As a third example filter, noisy interfaces can be excluded. Specifically, some agents can consistently have issues reaching specific target domain names. The same penalty used for noisy interfaces can be similarly applied to exclude path traces for those agents/target combinations.

As a fourth example filter, an ASN blacklist can be applied. Specifically, a blacklist of ASNs that keep having outages or keep throttling agent probes (e.g., Internap) can be identified and applied (e.g., such an ASN blacklist may include mostly Stub ASNs).

As a fifth example filter, a geo filter can be applied. Specifically, a geo filter can be utilized to exclude interfaces that cannot be geolocated precisely.

Terminal Events (or Interface Events)

In one embodiment, a terminal event involving interface X is defined in the scope of a single test, when one or more agents in the test have traces terminating at X, provided that the test and X are filtered by the conditions above. In this example, the tuple is (ASN, geo, interface).

Outage Events

In one embodiment, outage events are aggregations of terminal events on an ASN basis, that is, (ASN) tuple. For example, an outage can be specified as an event that exceeds some thresholds in terms of locations (e.g., min=1) as well as agents (e.g., min=2) and tests (e.g., min=2).

For example, if the interfaces involved in the outage are frequently dropping packets for a relatively long period of time, then such interfaces can (eventually) be suppressed (e.g., based on a threshold or other configurable parameter), and the outage state can be cleared. In this example, each 300 second bin can be evaluated individually for the purpose of outage triggering.

Interface Penalty

For example, the disclosed system can keep track of a penalty value for each interface that indicates how often the interface is seen terminating paths:

$$P(i,t)=P(i,t0)*e^{\wedge}[y*(t-t0)]+p$$

where

H: half-life=ln(2/y) is the time it takes for the penalty to decrease to half of its value;

t0: last round where penalty was updated;

p: incremental penalty, which the system can add every time the interface is seen terminating paths;

max_p: maximum penalty, this is the max value of penalty after which value does not grow, penalty can be normalized by max_p (0 to 100%);

reuse_p: the value of penalty below which an interface leaves the suppressed state; and suppress_p: the value of penalty above which the interface is suppressed.

In this example implementation, the penalty of all the interfaces is periodically stored in a database, so if the outage process restarts, then the penalty state can be restored.

Dynamic Outage Interfaces Threshold

Given that some ASes have a larger presence in specific geographic locations, it is desirable to determine if the amount of affected interfaces is sufficiently high to consider the event to be an outage. In an example implementation, a dynamic threshold is implemented which utilizes a percentage, bounded by a minimum and maximum, of the total number of interfaces belonging to an AS in a geographic location to be affected. The amount of interfaces seen for each AS/location is calculated daily based on a slice of the collected path trace data by the agents. For example, the thresholds used can be composed of the minimum affected interfaces per ASN/location, the maximum affected interfaces per ASN/location, and the percentage of affected interfaces per ASN/location. In this example implementation, if the minimum affected interfaces per ASN/location is 3 and the maximum affected interfaces per ASN/location is 10, then the percentage of affected interfaces per ASN/location is 30%.

Adding Outage Context to Path Visualization

FIG. 1 is a path visualization with overlaying outage context in accordance with some embodiments. For each path visualization view of a test, if there is an outage detected at the time the visualization refers to, then the system can add an indication about it. In FIG. 1, the system is configured to augment a path visualization 102 (e.g., the various example visualizations and screen shots have been anonymized with mock/example IP addresses, domain names/URLs, networks, and agent test names) with the following: (1) network (e.g., name and ASN) where the outage happened as shown at 104; (2) in-account tests affected as shown at 106; (3) number/list of geographic locations affected by the outage as shown at 108; and (4) number/list of interfaces (e.g., with IP addresses and reverse DNS names) affected by the outage as shown at 110 (e.g., in this example screen shot, the affected tests is selected for a drill-down showing Example-Test: 80 and 2 interfaces are affected by the outage as shown, and the Locations shown at 108 and Interfaces shown at 110 can be similarly selected to drill-down for the more detailed information for the number/list of geographic locations affected by the outage and number/list of interfaces affected by the outage, respectively).

Generalizing Outages to Multiple Networks

In some cases, the disclosed system can detect a substantial level of noise in outages, in particular, outages in edge networks that trigger an outage in the service provider side. To address this noise problem, in one embodiment, the system is configured to perform an additional pre-processing step to shift the outage location to the following network in the path traces. In most cases, this is an edge network. The disclosed system can detect funnel patterns like below where IP1/IP2 in network A are terminal interfaces in round N but connected to IP3 in network B in round N-1 (previous time interval), therefore, it is very likely that the problem is actually on the network B, not network A.

$$IP1(A)-IP3(B)$$

$$IP2(A)-IP3(B)$$

As such, the system can be configured to remove the incoming funnel interfaces from the original outage object (A above), and add the outgoing interface in the new outage object (B above), as illustrated below.

Outage in B
 IP3
 IP1 (peering)
 IP2 (peering)
Outage in A
 IP1 (removed)
 IP2 (removed)

Outage Map

Figure 2:
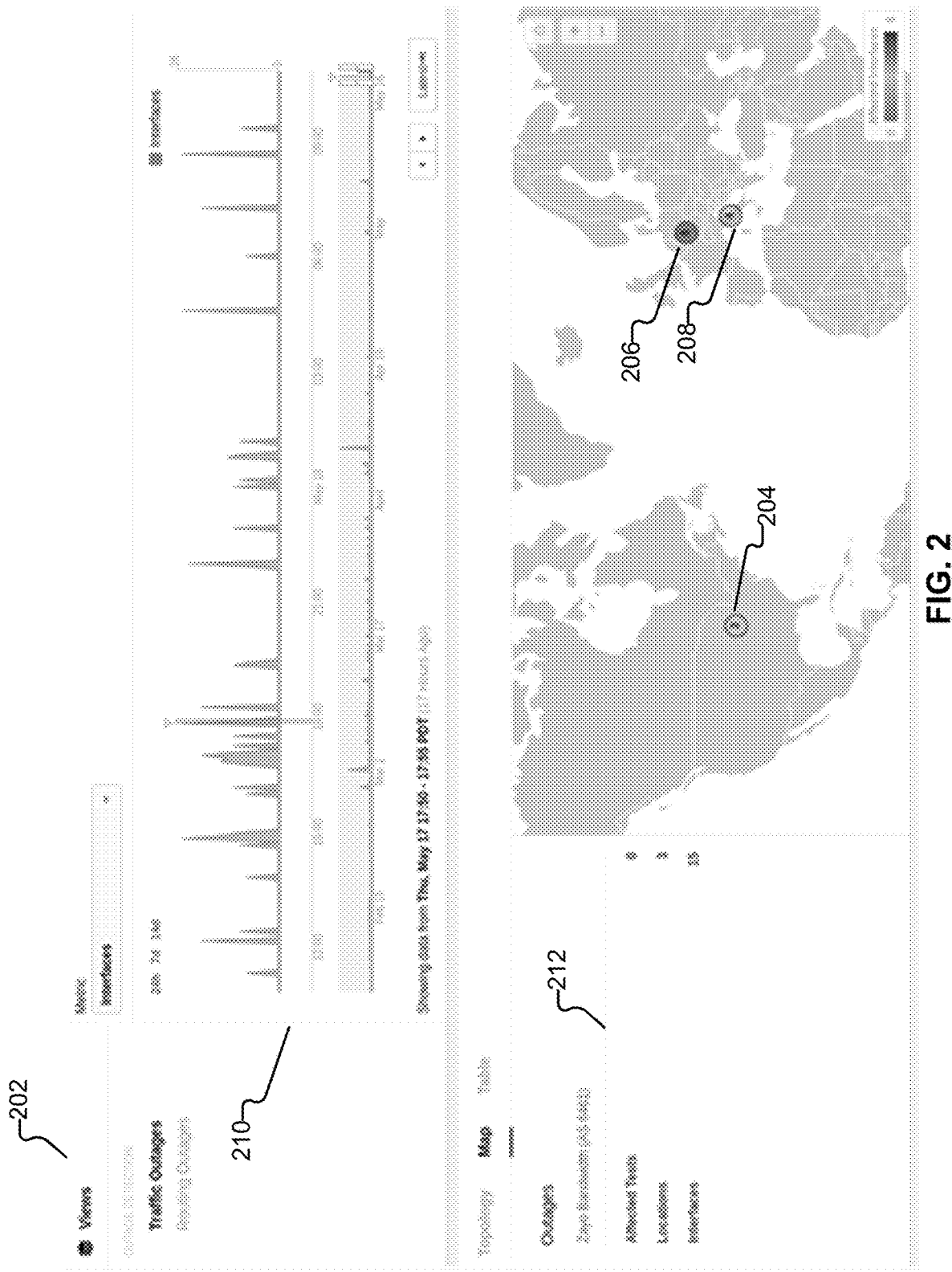
FIG. 2 is a world map visualization showing the geographic locations affected by the outage for a specific Zayo Bandwidth event in accordance with some embodiments.

FIG. 2 is a world map visualization showing the geographic locations affected by the outage for a specific Zayo Bandwidth event in accordance with some embodiments. In one embodiment, the system generates a user interface 202 (e.g., a graphical user interface (GUI)) that can represent each geographic location affected by an outage in a world map as shown in FIG. 2, annotated with the number of terminal events per geographic location as shown at 204, 206, and 208. In this example GUI, a navigational timeline 210 is provided that shows the number of terminal events per bin and allows a user to find spikes where the number of affected interfaces is high. As also shown in FIG. 2, a table 212 is provided with one row per outage detected, where the user interface also shows the affected interfaces, tests, and locations.

Outage Topology

Figure 3A:
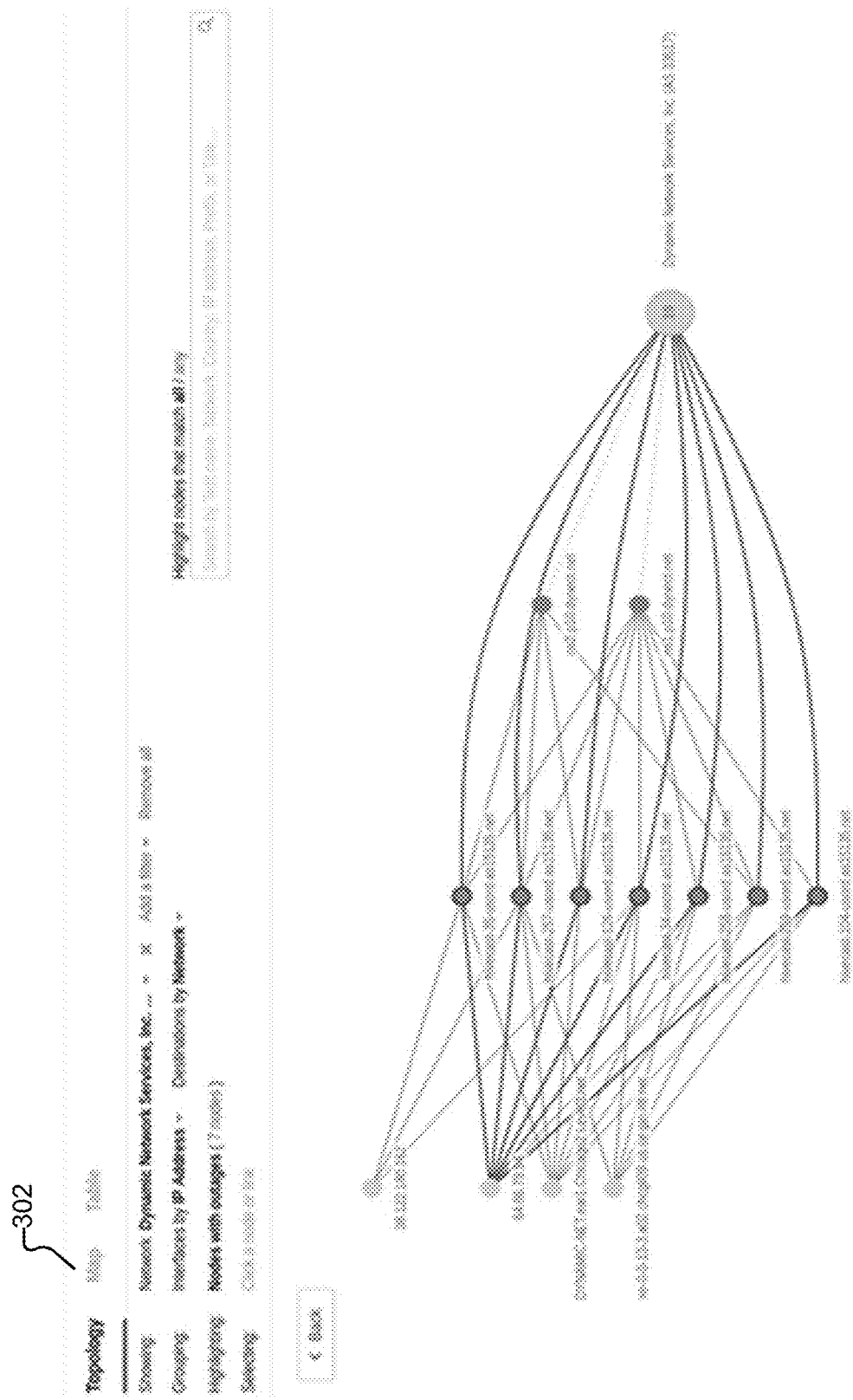
FIG. 3A is an outage topology visualization showing interfaces that are not grouped (IP addresses) in accordance with some embodiments.

FIG. 3A is an outage topology visualization showing interfaces that are not grouped (IP addresses) in accordance with some embodiments. In one embodiment, the system generates a user interface 302 (e.g., a GUI) that can represent the outage topology, such as shown in FIG. 3A (e.g., in which IP addresses have been provided with example/mock IP addresses and domain names have been provided with example/mock domain names, and for the other nodes such would also include their corresponding IP addresses but have been anonymized for purposes of this visualization), as an aggregation of all the path traces involved in the outage in a time window [N-2, N] where N is the first round where the outage is detected. By including time intervals before the outage is detected, the user interface can provide context around the outage. This is particularly of interest for terminal paths given that we generally will not be able to see beyond the outage time in case an outage happens.

Figure 3B:
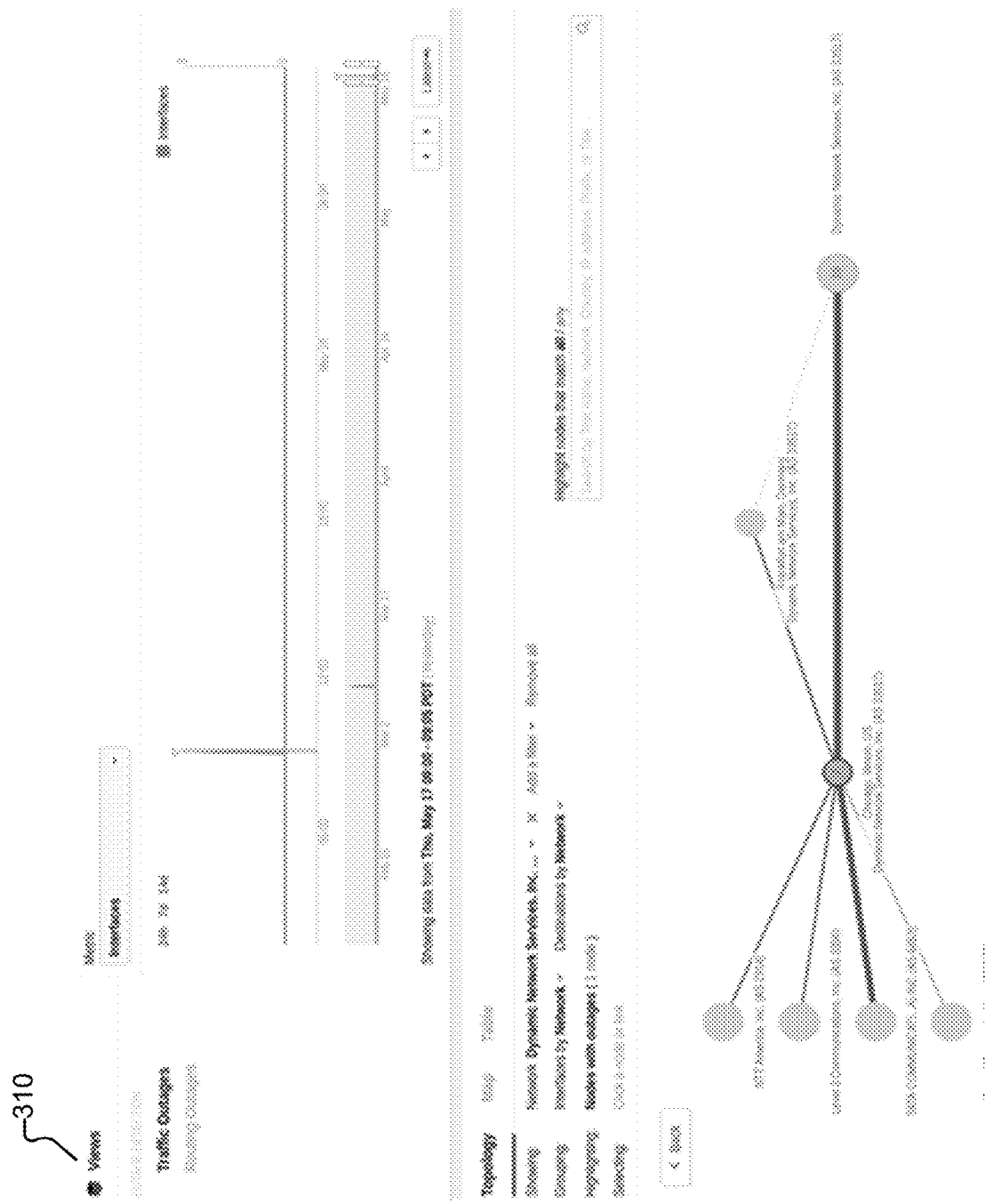
FIG. 3B is an outage topology visualization showing interfaces that are grouped by network and location in accordance with some embodiments.

FIG. 3B is an outage topology visualization showing interfaces that are grouped by network and location in accordance with some embodiments. As shown in FIG. 3B, the topology of an interface 310 allows different types of interface grouping according to, for example: network and location (e.g., Point of Presence (PoP)); network (e.g., ASN); location; and IP address. The destinations on the right can also be grouped according to, for example: network (e.g., ASN); and domain (e.g., public suffix list+1 level).

For example, the user interface can show up to two IP hops on each side of the topology as context, and can hide non-ISP interfaces, except if they belong to tests in the account where the user is logged in.

Figure 3C:
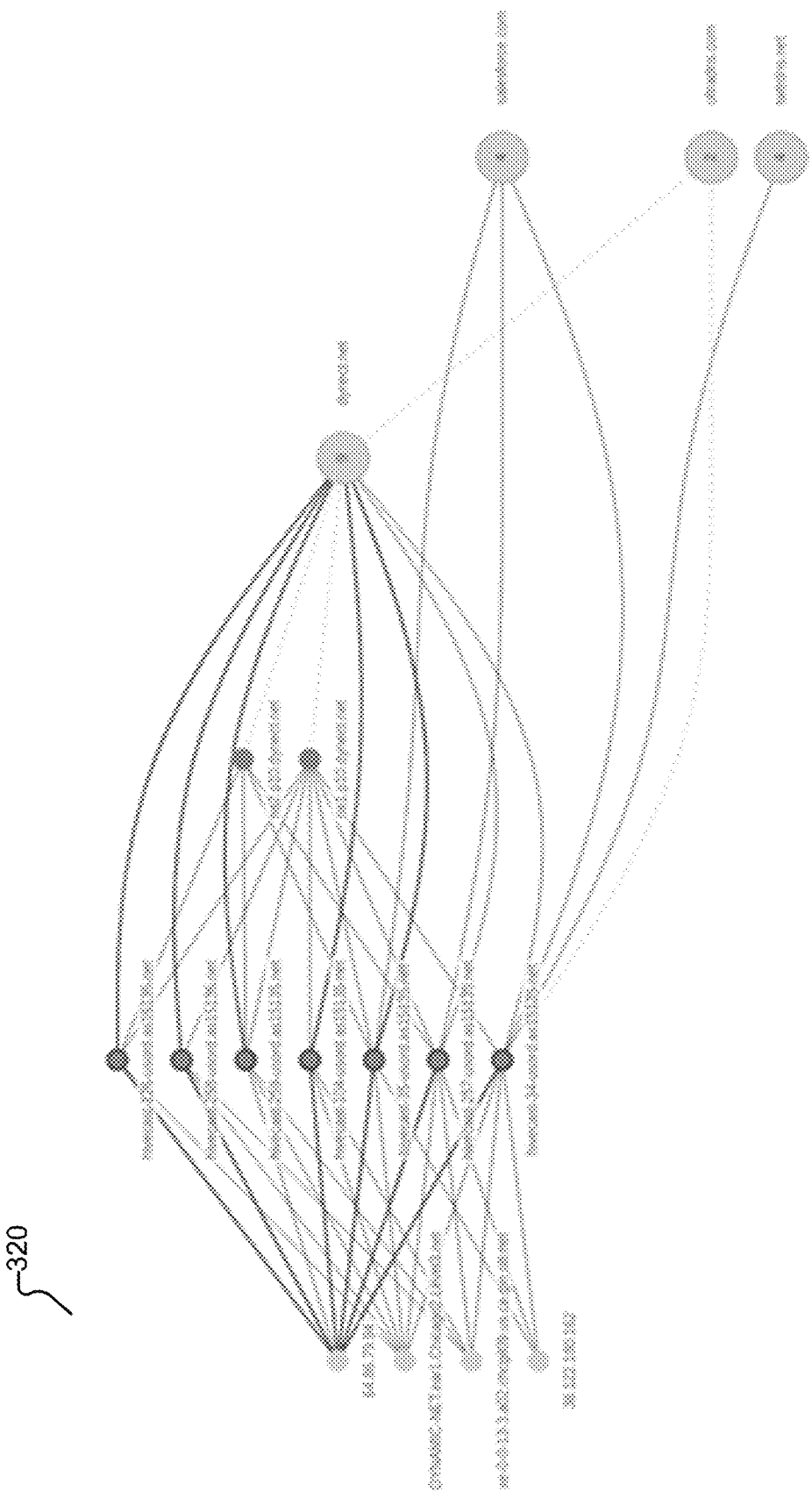
FIG. 3C is an outage topology visualization showing targets that are grouped by domain in accordance with some embodiments.

FIG. 3C is an outage topology visualization showing targets that are grouped by domain in accordance with some embodiments. As shown in FIG. 3C, the topology of an interface 320 is an outage topology visualization where targets are grouped by domain.

Alerting on Outages

In one embodiment, users can be alerted on certain outages according to some criteria that can include specific tests/destination IPs, interfaces, locations, and service providers; and a number of tests affected, interfaces, and locations. For routing outages, filters can include specific tests/prefixes, countries, service providers in root cause; and a number of tests affected and prefixes as described herein.

Example Use Case 1: Outage Affecting Traffic Targeting Port 443

Figure 4A:
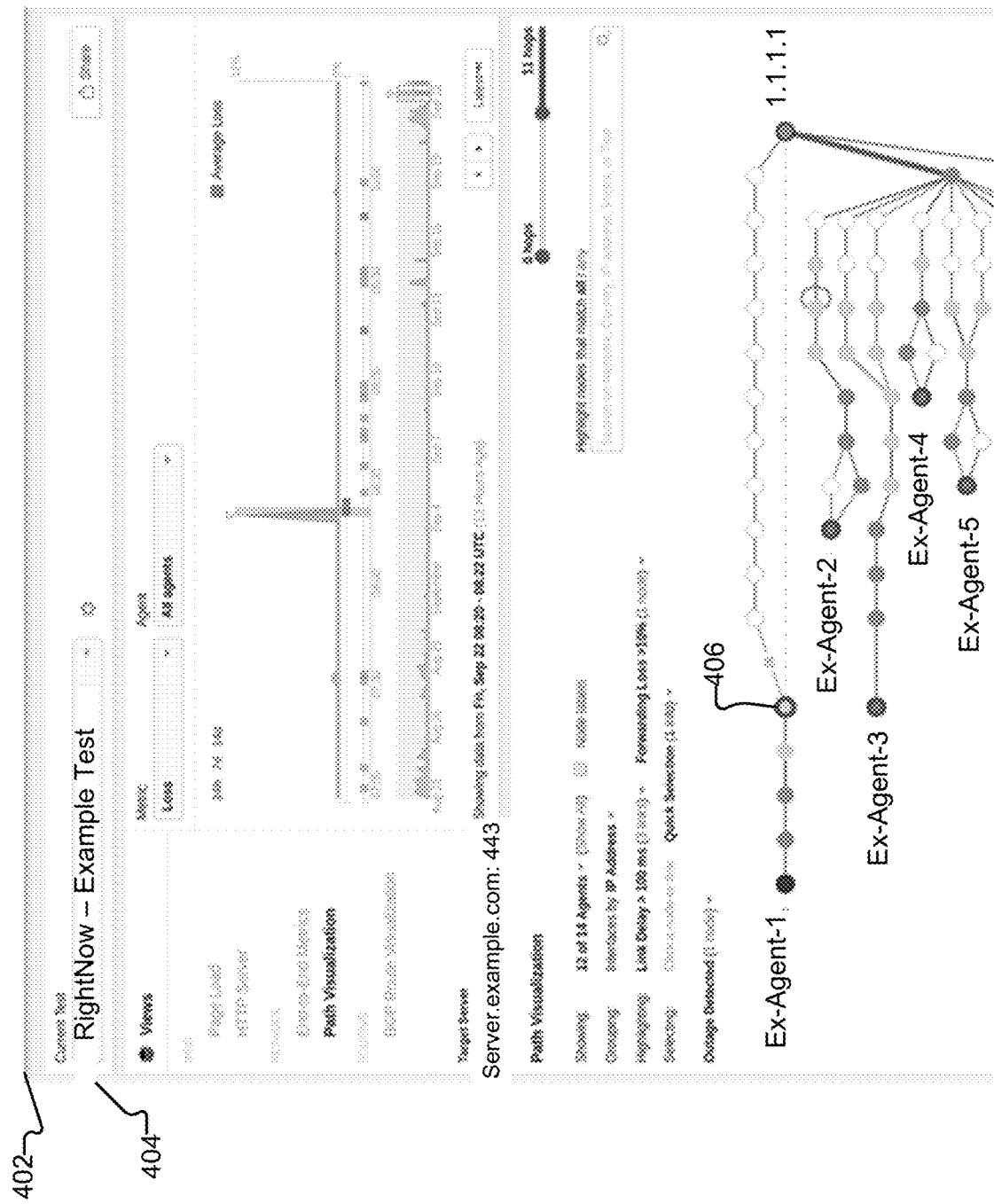
FIG. 4A is a visualization of an example use case of an outage affecting traffic targeting port 443 in accordance with some embodiments.

FIG. 4A is a visualization of an example use case of an outage affecting traffic targeting port 443 in accordance with some embodiments. As shown, FIG. 4A illustrates a visualization 402 of the example use case of an outage affecting traffic targeting port 443 that is a result of performing a test, shown as RightNow—Example Test 404, which is using multiple agents, shown as Ex-Agent-1, Ex-Agent-2, Ex-Agent-3, Ex-Agent-4, and Ex-Agent-5, that is set up targeting a server on port 443, shown as IP address 1.1.1.1. In this first example use case, the traffic does not reach the destination from one of the agents, Ex-Agent-1, configured in the test and instead terminates on a node belonging to ASN 6327, as shown at 406 in FIG. 4A.

Figure 4B:
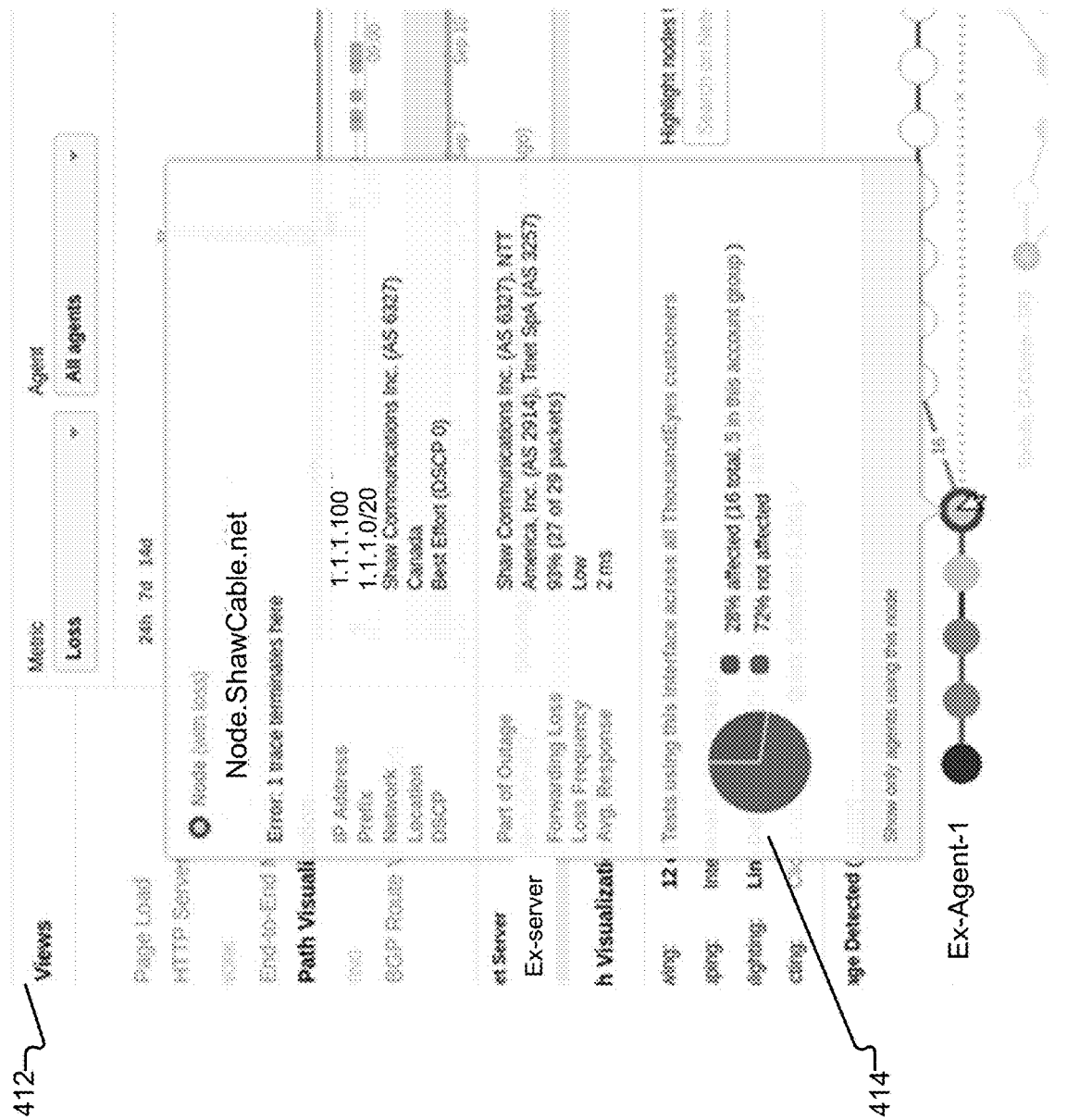
FIG. 4B is another visualization of the example use case of an outage affecting traffic targeting port 443 in accordance with some embodiments.

FIG. 4B is another visualization of the example use case of an outage affecting traffic targeting port 443 in accordance with some embodiments. As shown, FIG. 4B illustrates another visualization 412 of the example use case of an outage affecting traffic targeting port 443. Specifically, mousing over the terminal node displays a pie chart as shown at 414, which indicates how many tests that used the node were affected by it as shown in FIG. 4B.

Figure 4C:
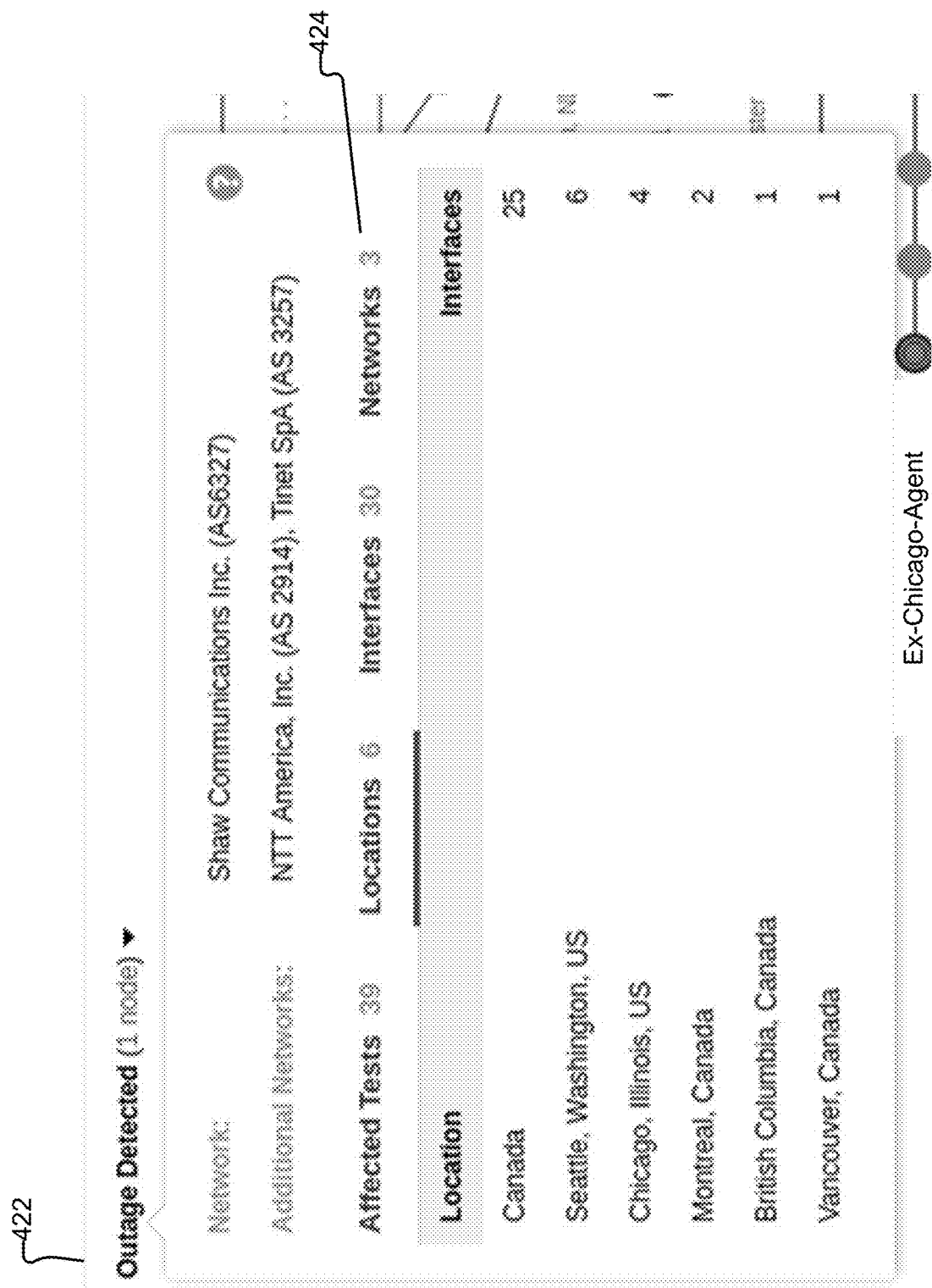
FIG. 4C is another visualization of the example use case of an outage affecting traffic targeting port 443 in accordance with some embodiments.

FIG. 4C is another visualization of the example use case of an outage affecting traffic targeting port 443 in accordance with some embodiments. As shown, FIG. 4C illustrates another visualization 422 of the example use case of an outage affecting traffic targeting port 443. Specifically, checking the outage details, we can see that this one affected multiple networks as shown at 424 in FIG. 4C. This means that terminal nodes belonging to other networks (e.g., ASN 2914 and 3257 in this example use case) were found in multiple tests, but this was actually caused by an issue in ASN 6327 to which both of them were connected.

Figure 4D:
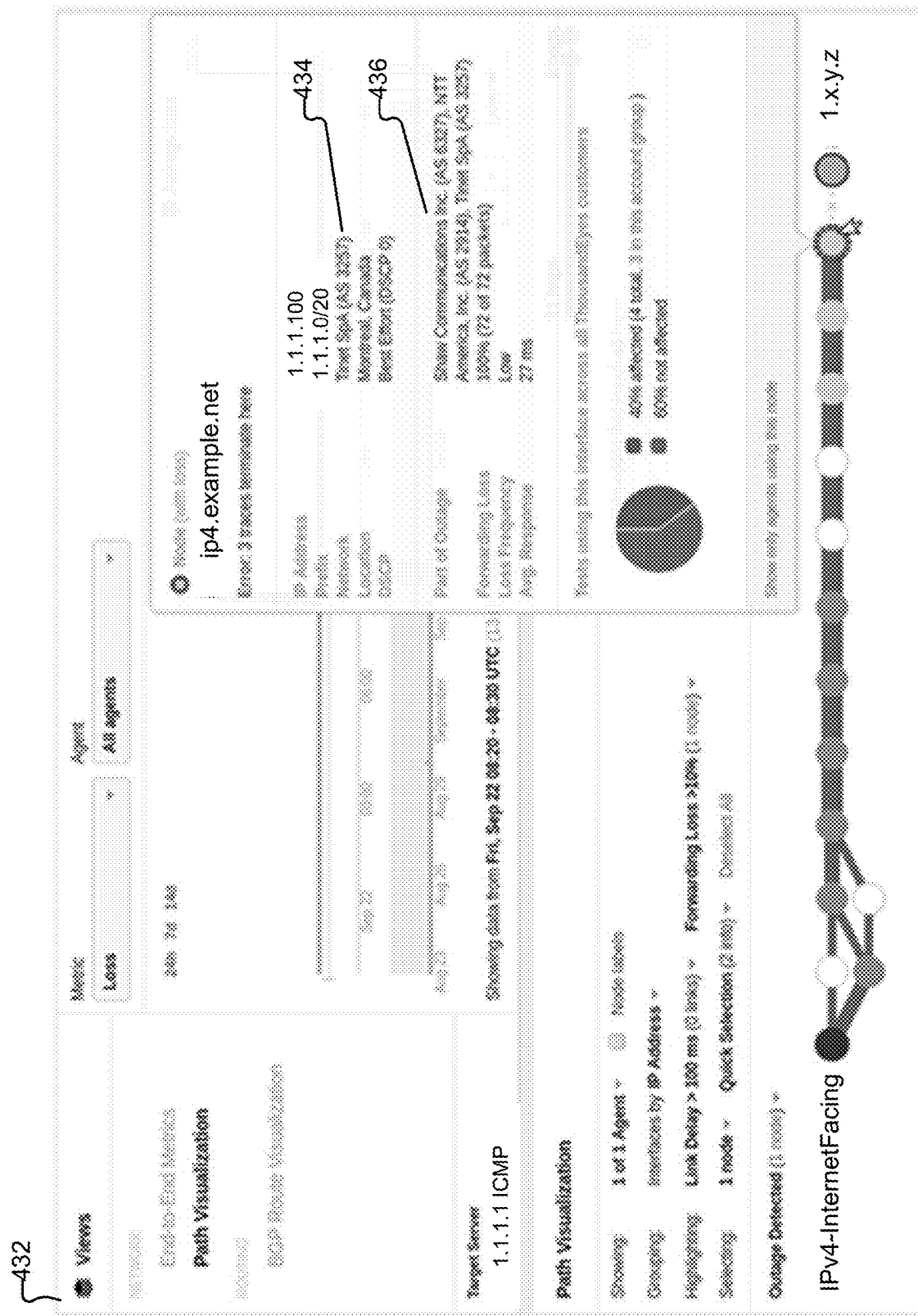
FIG. 4D is another visualization of the example use case of an outage affecting traffic targeting port 443 in accordance with some embodiments.

FIG. 4D is another visualization of the example use case of an outage affecting traffic targeting port 443 in accordance with some embodiments. As shown, FIG. 4D illustrates another visualization 432 of the example use case of an outage affecting traffic targeting port 443. Specifically, another test was affected by this same outage, but we can see that the terminal node in it belongs to ASN 3257 as shown at 434 in FIG. 4D. All of these tests are marked as being affected by the same outage, which involved issues in ASN 6327, 3257, and 2914 as shown at 436 in FIG. 4D.

Example Use Case 2: Hosting Provider Outage

Figure 5:
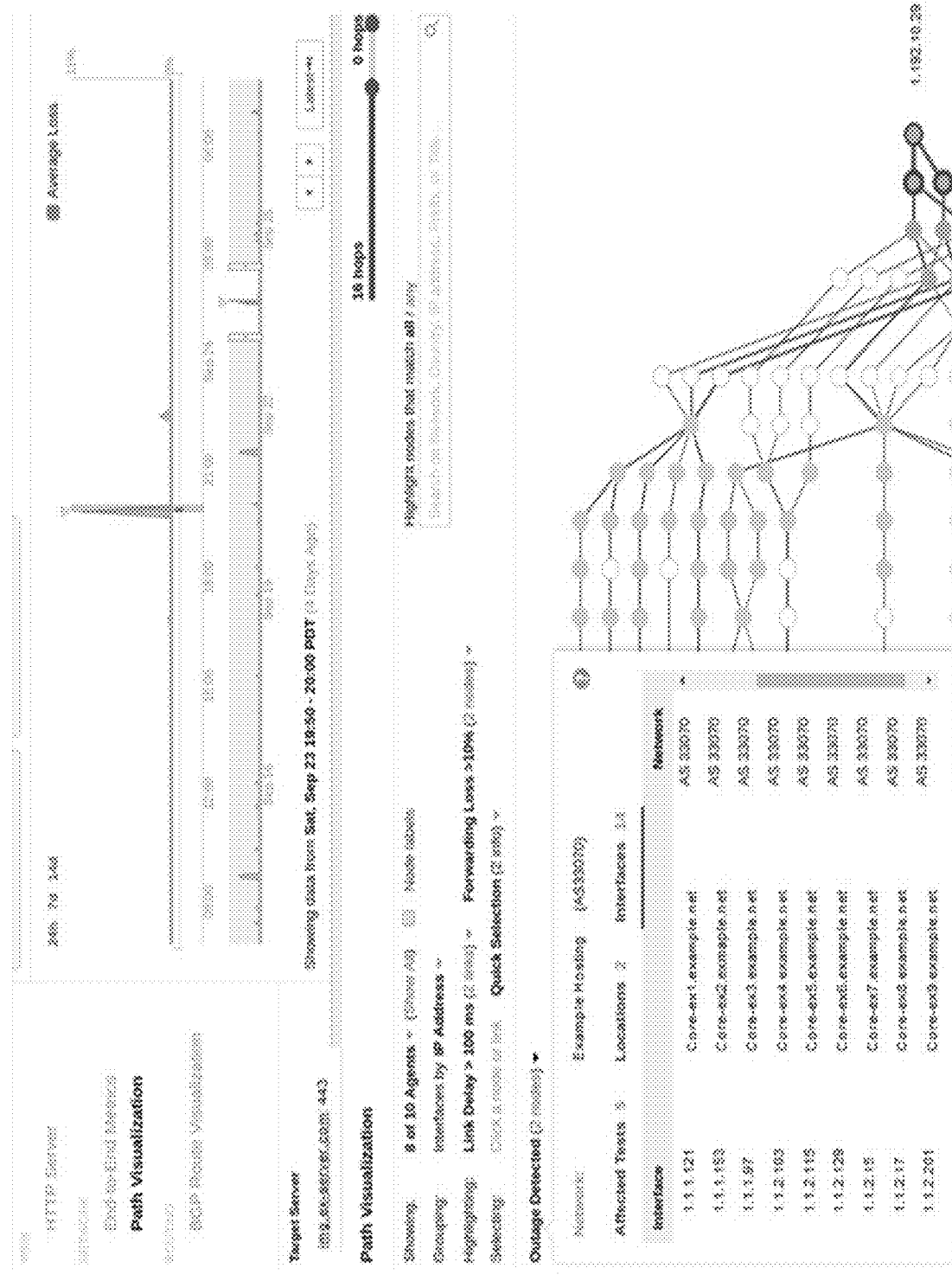
FIG. 5 is a visualization of an example use case of a hosting provider outage in accordance with some embodiments.

FIG. 5 is a visualization of an example use case of a hosting provider outage in accordance with some embodiments. In this second example use case, a hosting provider (e.g., example.net hosting provider) had an outage that affected several tests. As in the previous use case (e.g., Example Use Case 1 described above), one can see all the affected interfaces by the outage and jump to all affected tests and see the impact on them as shown in visualization 502 illustrated in FIG. 5.

Figure 6:
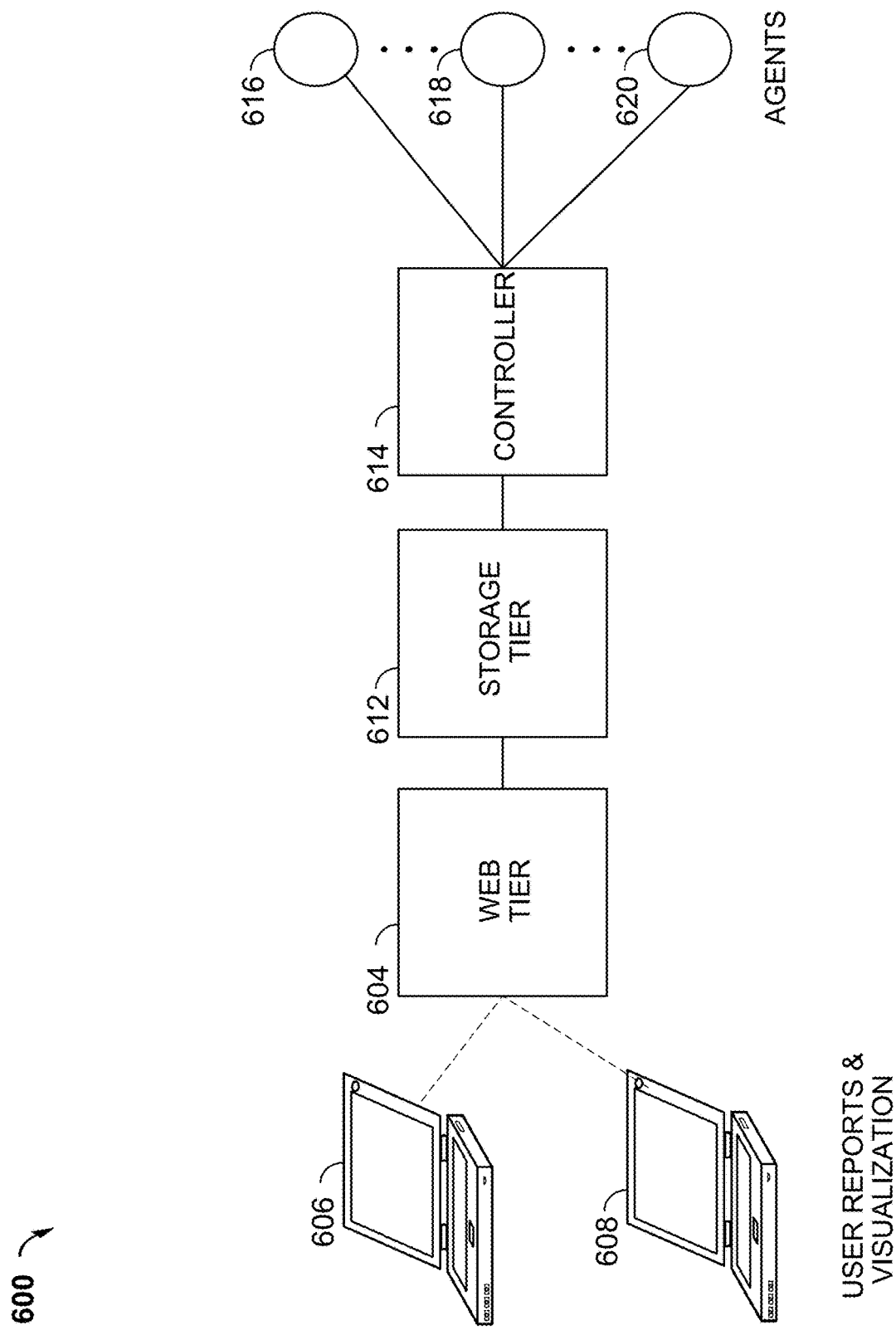
FIG. 6 is a system diagram of a platform architecture for performing traffic outage detection in the Internet in accordance with some embodiments.

System Architecture of a Platform for Performing Traffic Outage Detection in the Internet An example of a system architecture of a platform for performing traffic outage detection in the Internet is shown in FIG. 6 as described below.

FIG. 6 is a system diagram of a platform architecture for performing traffic outage detection in the Internet in accordance with some embodiments. For example, the operations described in FIG. 6 can be configured to perform the techniques described above with respect to various embodiments.

In particular, FIG. 6 illustrates an environment in which a platform 600 for performing traffic outage detection in the Internet includes agents 616-620 (e.g., cloud and/or enterprise agents, which can be configured to perform certain tests, have labels, and/or perform on demand, event/context triggered, and/or scheduled tests, such as similarly described herein) that collect data based on configured tests, and the agents 616-620 send this data to a controller(s) 614 (e.g., agent controller(s)). Controller 614 stores the data in a storage tier 612 (e.g., providing permanent storage) that can be used by a web tier 604 to generate visualizations, alerts, and/or reports to users accessing platform 600 using client/endpoint devices 606 and 608 (e.g., computers, laptops, smartphones, and/or various other computing devices), such as various visualizations, alerts, and/or reports as similarly described above.

In various embodiments, platform 600 is a scalable, elastic architecture and may comprise several distributed components, including components provided by one or more third parties. Further, when platform 600 is referred to as performing a task, such as storing data or processing data, it is to be understood that a sub-component or multiple sub-components of platform 600 (whether individually or in cooperation with third party components) may cooperate to perform that task.

Example processes for performing traffic outage detection in the Internet using the disclosed techniques will now be described below.

Processes for Performing Traffic Outage Detection in the Internet

Figure 7:
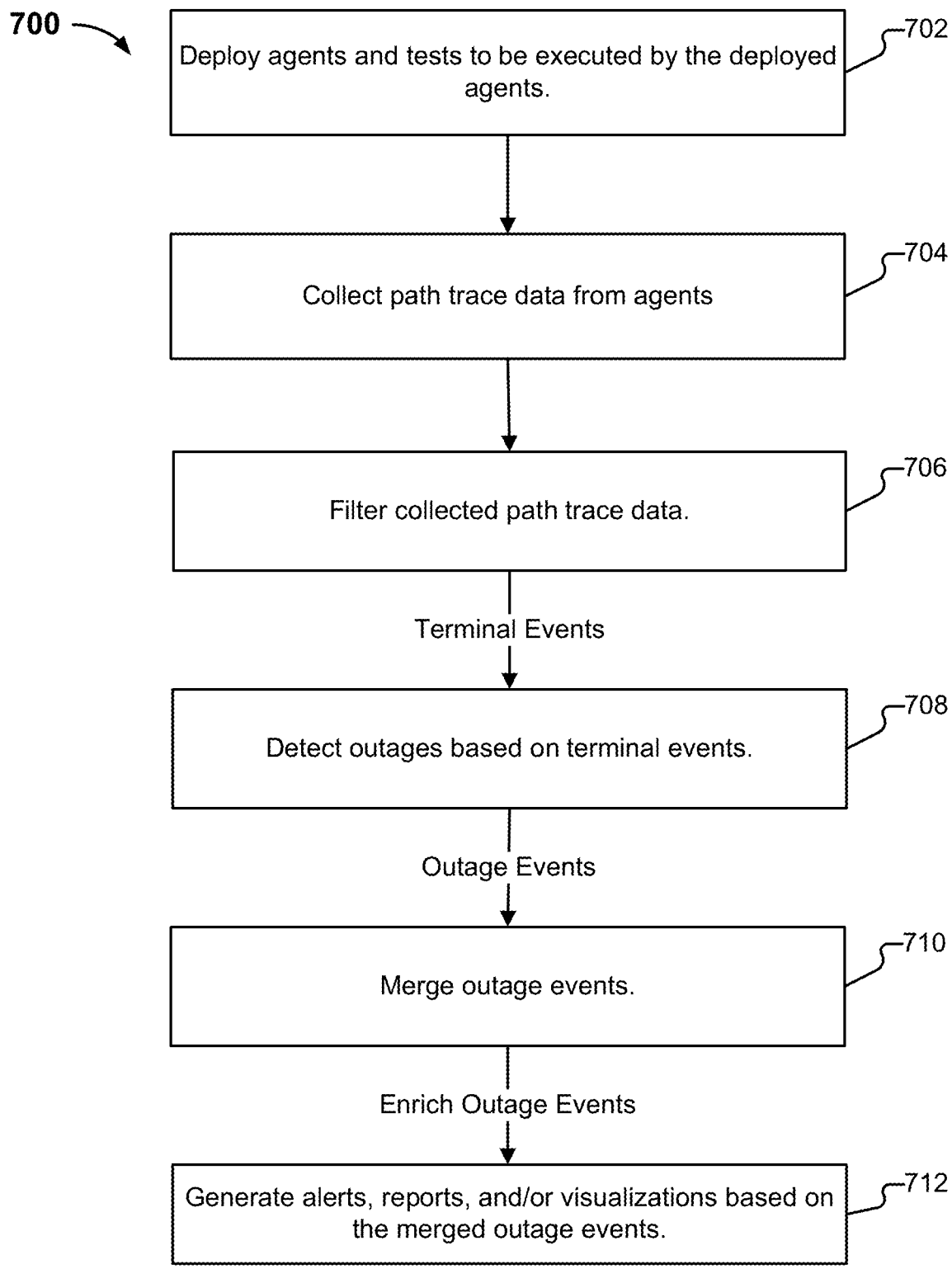
FIG. 7 is a flow diagram of a process for performing traffic outage detection in the Internet in accordance with some embodiments.

FIG. 7 is a flow diagram of a process for performing traffic outage detection in the Internet in accordance with some embodiments. In some embodiments, process 700 is performed using platform 600 as shown in FIG. 6 and techniques described above with respect to various embodiments.

At 702, deploying a plurality of agents and tests to be executed by the deployed agents is performed. For example, a plurality of agents can be cloud and/or enterprise agents that can be configured to perform various active network tests as similarly described above.

At 704, collecting path trace data from each of the plurality of agents is performed. For example, path trace data test results from each of the plurality of endpoint agents can be collected using the platform described above.

At 706, filtering the collected path trace data is performed. For example, various filtering operations that the system can use to filter the noise on interfaces can be performed using the platform described above. As shown, an output of this filtering operation includes terminal events.

At 708, detecting outages based on terminal events is performed. For example, a dynamic outage interfaces threshold operation can be performed using the platform described above to facilitate detection of outages based on the terminal events as similarly described above. As shown, an output of this detecting outages operation includes outage events.

At 710, merging outage events is performed. For example, various detected outages can be merged based on aggregations of terminal events on an ASN basis using the platform as similarly described above. As shown, an output of this filtering operation includes enrich outage events.

At 712, generating alerts, reports, and/or visualizations based on the merged outage events is performed. For example, various alerts, reports, and/or visualizations based on the merged and enriched outage events can be performed using the platform as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
deploy a plurality of agents and a plurality of tests to be executed by the deployed agents;
collect path trace data from the plurality of agents, wherein the path trace data is based on collected test results from each of the plurality of agents for the plurality of tests;
filter the path trace data to remove:
a) one or more interfaces in a source network or a stub network by determining whether the one or more interfaces are in an autonomous system number (ASN) blacklist,
b) one or more noisy interfaces indicative of time exceeded or noisy targets indicative of issues reaching a domain, and
c) one or more interfaces that cannot be geolocated;
identify and aggregate one or more terminal events by determining that a trace, from the path trace data after being filtered, terminates at a particular interface; and
detect a network outage at the particular interface in response to determining that the one or more terminal events in the aggregate satisfy a dynamic outage interface threshold, wherein the dynamic outage interface threshold is calculated daily based on a number of interfaces in a geographic location; and
a memory coupled to the processor and configured to provide the processor with instructions.

2. The system recited in claim 1, wherein each of the plurality of agents is controlled by an agent controller.

3. The system recited in claim 1, wherein a graphical visualization of the network outage is generated by a web tier.

4. The system recited in claim 1, where in each of the plurality of tests that can be performed by the agents is configurable.

5. The system recited in claim 1, wherein the processor is further configured to:
filter the path trace data using a plurality of filtering operations including filtering noisy interfaces and/or noisy targets and filtering HyperText Transfer Protocol (HTTP) ports 80 and 443.

6. The system recited in claim 1, wherein the processor is further configured to:
merge outage events based on aggregations of terminal events on an Autonomous System Number (ASN) basis.

7. The system recited in claim 1, wherein the processor is further configured to:
generate a graphical visualization of the outage detection.

8. The system recited in claim 1, wherein the processor is further configured to:
generate a graphical visualization of the outage detection; and
output the graphical visualization of the outage detection.

9. A method, comprising:
deploying a plurality of agents and a plurality of tests to be executed by the deployed agents;
collecting path trace data from the plurality of agents, wherein the path trace data is based on collected test results from each of the plurality agents for the plurality of tests;
filtering the path trace data to remove:
a) one or more interfaces in a source network or a stub network by determining whether the one or more interfaces are in an autonomous system number (ASN) blacklist,
b) one or more noisy interfaces indicative of time exceeded or noisy targets indicative of issues reaching a domain, and
c) one or more interfaces that cannot be geolocated;
identifying and aggregating one or more terminal events by determining that a trace, from the path trace data after being filtered, terminates at a particular interface; and
detecting a network outage at the particular interface in response to determining that the one or more terminal events in the aggregate satisfy a dynamic outage interface threshold, wherein the dynamic outage interface threshold is calculated daily based on a number of interfaces in a geographic location.

10. The method of claim 9, wherein the plurality of agents are controlled by an agent controller.

11. The method of claim 9, wherein a graphical visualization is generated by a web tier.

12. The method of claim 9, wherein each of the plurality of tests that can be performed by the agents is configurable.

13. The method of claim 9, further comprising:
merging outage events based on aggregations of terminal events on an Autonomous System Number (ASN) basis.

14. A computer program product, the computer program product being embodied in a non-transitory tangible computer readable storage medium and comprising computer instructions for:
deploying a plurality of agents and a plurality of tests to be executed by the deployed agents;

collecting path trace data from the plurality of agents, wherein the path trace data is based on collected test results from each of the plurality agents for the plurality of tests;

filtering the path trace data to remove:
- a) one or more interfaces in a source network or a stub network by determining whether the one or more interfaces are in an autonomous system number (ASN) blacklist,
- b) one or more noisy interfaces indicative of time exceeded or noisy targets indicative of issues reaching a domain, and
- c) one or more interfaces that cannot be geolocated;

identifying and aggregating one or more terminal events by determining that a trace, from the path trace data after being filtered, terminates at a particular interface; and detecting a network outage at the particular interface by determining whether the one or more terminal events in the aggregate satisfy a dynamic outage interface threshold, wherein the dynamic outage interface threshold is calculated daily based on a number of interfaces in a geographic location.

15. The computer program product recited in claim 14, wherein the plurality of agents are controlled by an agent controller.

16. The computer program product recited in claim 14, wherein a graphical visualization is generated by a web tier.

17. The computer program product recited in claim 14, further comprising computer instructions for:
merging outage events based on aggregations of terminal events on an Autonomous System Number (ASN) basis.

18. The system recited in claim 1, wherein the processor is further configured to:
filter the collected path trace data using at least one or more of: a whitelist filter, a noise filter, a geography-based filter, and a port-based filter.

19. The system recited in claim 1, wherein the processor is further configured to:
filter the collected path trace data using at least two or more of: a whitelist filter, a noise filter, a geography-based filter, and a port-based filter.

* * * * *

UNITED STATES PATENT AND TRADEMARK OFFICE
CERTIFICATE OF CORRECTION

PATENT NO. : 11,729,043 B2
APPLICATION NO. : 16/013717
DATED : August 15, 2023
INVENTOR(S) : Ricardo V. Oliveira et al.

Page 1 of 1

It is certified that error appears in the above-identified patent and that said Letters Patent is hereby corrected as shown below:

In the Specification

Column 7, Line 63, please amend as shown:
this example screen shot, the affected tests are selected for a Column 9, Line 3, please amend as shown:
interface groupings according to, for example: network and Column 9, Line 24, please amend as shown:
tests/prefixes, countries, service providers in root cause, and Column 11, Line 20, please amend as shown:
filtering operation includes enriched outage events.

Signed and Sealed this
Fourteenth Day of November, 2023

Katherine Kelly Vidal
*Director of the United States Patent and Trademark Office*